(12) United States Patent
Loveridge (10) Patent No.: US 9,750,092 B2
(45) Date of Patent: Aug. 29, 2017

(54) POWER MANAGEMENT OF AN LED-BASED ILLUMINATION DEVICE

(71) Applicant: Xicato, Inc., San Jose, CA (US)

(72) Inventor: Barry Mark Loveridge, San Jose, CA (US)

(73) Assignee: Xicato, Inc., San Jose, CA (US)

( * ) Notice: Subject to any disclaimer, the term of this patent is extended or adjusted under 35 U.S.C. 154(b) by 0 days.

(21) Appl. No.: 15/283,062

(22) Filed: Sep. 30, 2016

(65) Prior Publication Data

US 2017/0099709 A1  Apr. 6, 2017

Related U.S. Application Data

(60) Provisional application No. 62/236,054, filed on Oct. 1, 2015.

(51) Int. Cl.
*H05B 37/00* (2006.01)
*H05B 33/08* (2006.01)

(52) U.S. Cl.
CPC ..... *H05B 33/0812* (2013.01); *H05B 33/0815* (2013.01); *H05B 33/0845* (2013.01)

(58) Field of Classification Search
CPC ............ H05B 33/0812; H05B 33/0815; H05B 33/0845
USPC .......................................................... 315/185
See application file for complete search history.

(56) References Cited

U.S. PATENT DOCUMENTS

| | | | |
|---|---|---|---|
| 5,959,316 A | 9/1999 | Lowery | |
| 6,351,069 B1 | 2/2002 | Lowery et al. | |
| 6,504,301 B1 | 1/2003 | Lowery | |
| 6,586,882 B1 | 7/2003 | Harbers | |
| 6,600,175 B1 | 7/2003 | Baretz et al. | |
| 6,680,569 B2 | 1/2004 | Mueller-Mach et al. | |
| 6,812,500 B2 | 11/2004 | Reeh et al. | |
| 7,126,162 B2 | 10/2006 | Reeh et al. | |
| 7,250,715 B2 | 7/2007 | Mueller et al. | |
| 7,479,662 B2 | 1/2009 | Soules et al. | |
| 7,564,180 B2 | 7/2009 | Brandes | |
| 7,614,759 B2 | 11/2009 | Negley | |
| 7,629,621 B2 | 12/2009 | Reeh et al. | |
| 2007/0081336 A1 | 4/2007 | Bierhuizen et al. | |
| 2008/0018261 A1* | 1/2008 | Kastner | F21V 23/00 315/192 |
| 2012/0133295 A1* | 5/2012 | Pereira | H05B 33/0815 315/210 |
| 2015/0305109 A1* | 10/2015 | Lee | H05B 33/0815 315/224 |

* cited by examiner

*Primary Examiner* — Daniel D Chang
(74) *Attorney, Agent, or Firm* — Silicon Valley Patent Group LLP (57) ABSTRACT

An LED based lighting system includes a controlled current power supply (CCPS) coupled to provide electrical power to an LED based light engine having a plurality of light emitting diodes electrically coupled in series. The LED based lighting system further includes a controlled voltage power supply (CVPS) electrically coupled to the CCPS. A difference between an output voltage on the output node of the CVPS and an input voltage at the input node of the CCPS is used to adjust the output voltage at the output node of the CVPS.

20 Claims, 8 Drawing Sheets

FIG. 11

POWER MANAGEMENT OF AN LED-BASED ILLUMINATION DEVICE

CROSS REFERENCE TO RELATED APPLICATIONS

This application claims priority under 35 USC 119 to U.S. Provisional Application No. 62/236,054, filed Oct. 1, 2015, which is incorporated by reference herein in its entirety.

TECHNICAL FIELD

The described embodiments relate to illumination devices that include Light Emitting Diodes (LEDs).

BACKGROUND

The use of light emitting diodes in general lighting is still limited due to limitations in light output level or flux generated by the illumination devices. Illumination devices that use LEDs also typically suffer from poor color quality characterized by color point instability. The color point instability varies over time as well as from part to part. Poor color quality is also characterized by poor color rendering, which is due to the spectrum produced by the LED light sources having bands with no or little power. Further, illumination devices that use LEDs typically have spatial and/or angular variations in the color. Additionally, illumination devices that use LEDs are expensive due to, among other things, the necessity of required color control electronics and/or sensors to maintain the color point of the light source or using only a small selection of produced LEDs that meet the color and/or flux requirements for the application.

Consequently, improvements to illumination device that uses light emitting diodes as the light source are desired. In particular, improvements in deep dimming performance are desired.

SUMMARY

An LED based lighting system includes a controlled current power supply (CCPS) coupled to provide electrical power to an LED based light engine having a plurality of light emitting diodes electrically coupled in series. The LED based lighting system further includes a controlled voltage power supply (CVPS) electrically coupled to the CCPS. A difference between an output voltage on the output node of the CVPS and an input voltage at the input node of the CCPS is used to adjust the output voltage at the output node of the CVPS.

In one implementation, an LED based lighting system includes an LED based light engine comprising a plurality of light emitting diodes electrically coupled in series; a controlled current power supply (CCPS) having an input node and an output node, wherein the LED based light engine is electrically coupled to the output node of the CCPS, wherein the CCPS is configured to receive electrical power on the input node of the CCPS and provide electrical power to the LED based light engine on the output node of the CCPS; a controlled voltage power supply (CVPS) having an input node and an output node, wherein the input node of the CCPS is electrically coupled to the output node of the CVPS, the CVPS configured to receive electrical power on the input node of the CVPS and provide the electrical power to the CCPS on the output node of the CVPS, the CVPS configured to: receive an indication of a first voltage at the input node of the CCPS; determine a second voltage at the output node of the CVPS; determine a difference between the second voltage at the output node of the CVPS and the first voltage at the input node of the CCPS; provide a third voltage at the output node of the CVPS based on the difference.

In one implementation, a method includes receiving an indication of a first voltage at an input node of a controlled current power supply (CCPS), wherein an output node of the CCPS is electrically coupled to an LED based light engine comprising a plurality of light emitting diodes electrically coupled in series; determining a second voltage at an output node of a controlled voltage power supply (CVPS), wherein the input node of the CCPS is electrically coupled to the output node of the CVPS; determining a difference between the second voltage at the output node of the CVPS and the first voltage at the input node of the CCPS; and providing a third voltage at the output node of the CVPS based at least in part on the difference.

In one implementation, a programmable controlled voltage power supply (CVPS) includes a power converter electrically coupled to an electrical power source and a controlled current power supply (CCPS); and a microcontroller configured to: receive an indication of an input voltage at an input node of the CCPS, wherein the CCPS is electrically coupled to an LED based light engine comprising a plurality of light emitting diodes electrically coupled in series; determine an output voltage at an output node of the CVPS, wherein the input node of the CCPS is electrically coupled to the output node of the CVPS; determine a difference between the output voltage at the output node of the CVPS and the input voltage at the input node of the CCPS; and communicate a first command signal to the power converter that causes the power converter to provide a second output voltage at the output node of the CVPS based at least in part on the difference.

DETAILED DESCRIPTION

Reference will now be made in detail to background examples and some embodiments of the invention, examples of which are illustrated in the accompanying drawings.

Figure 1:
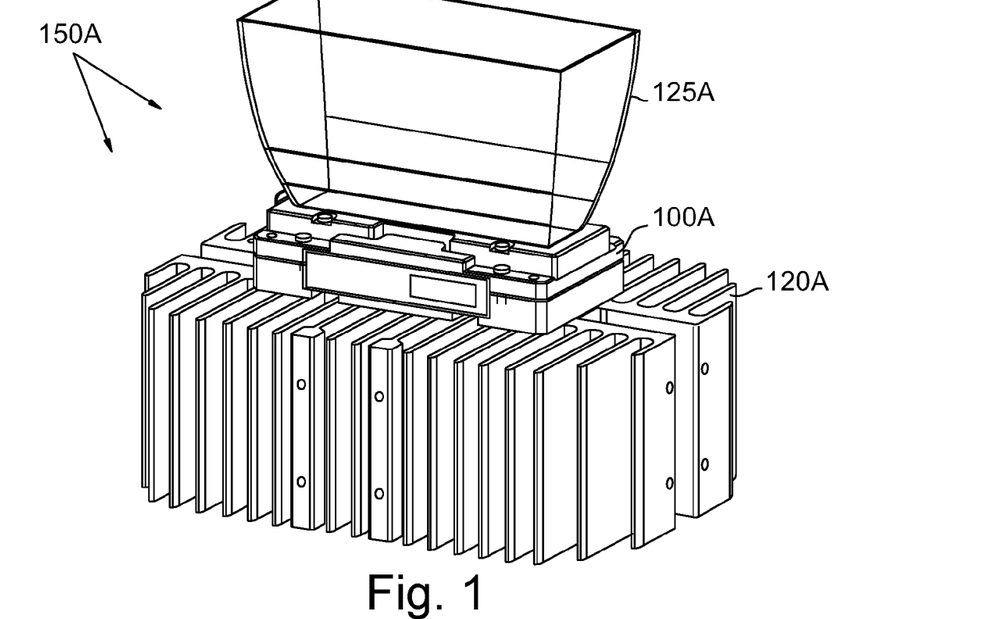
FIGS. 1, 2, and 3 illustrate exemplary luminaires, including an illumination device, reflector, and light fixture.
Figure 2:
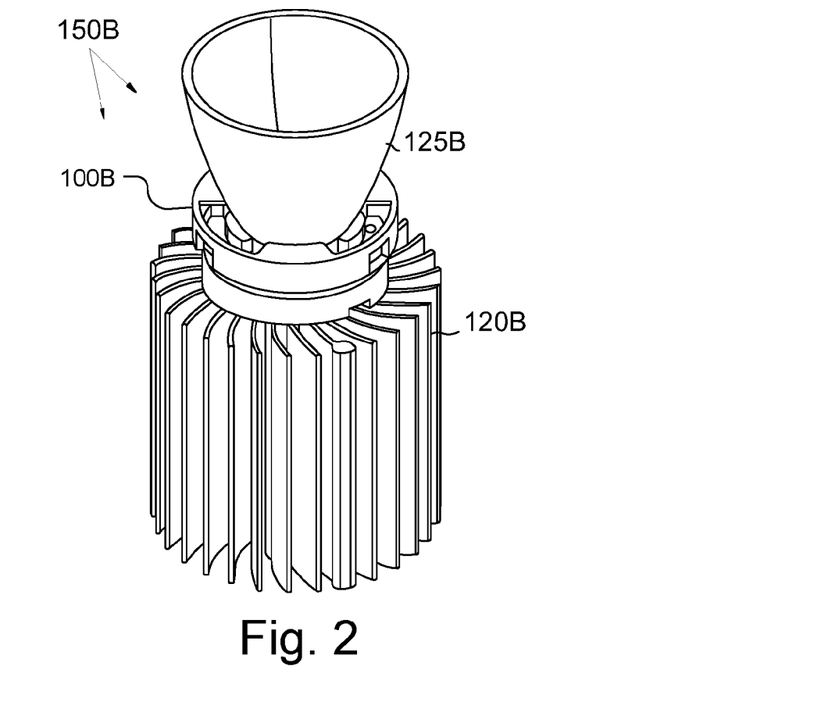
Figure 3:
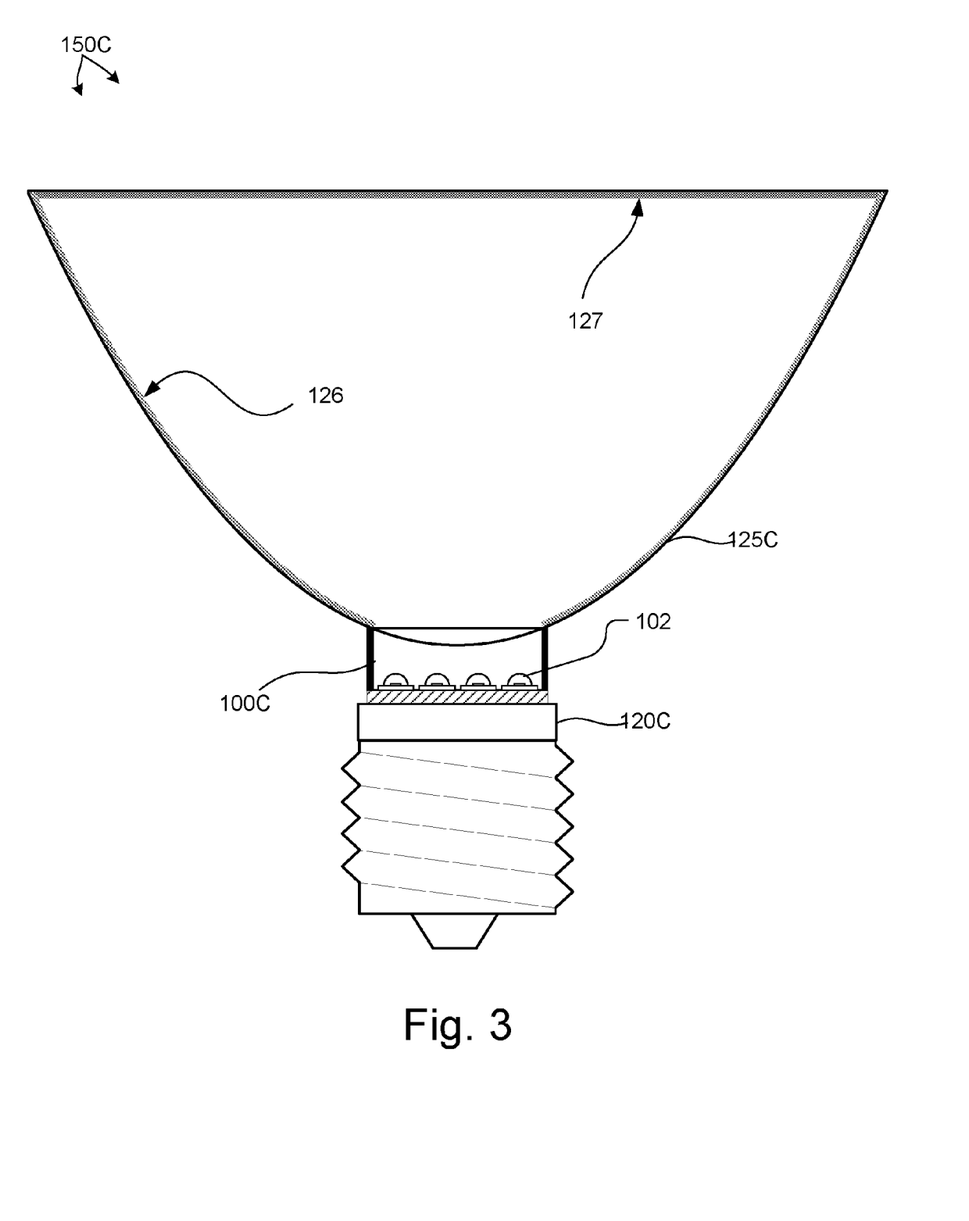

FIGS. 1, 2, and 3 illustrate three exemplary luminaires, respectively all labeled 150A, 150B, and 150C (sometimes collectively or generally referred to as luminaire 150). The luminaire 150A illustrated in FIG. 1 includes an illumination device 100A with a rectangular form factor. The luminaire 150B illustrated in FIG. 2 includes an illumination device 100B with a circular form factor. The luminaire 150C illustrated in FIG. 3 includes an illumination device 100C integrated into a retrofit lamp device. These examples are for illustrative purposes. Examples of illumination devices of general polygonal and elliptical shapes may also be contemplated. Luminaire 150 includes illumination device 100, reflector 125, and light fixture 120. FIG. 1 illustrates luminaire 150A with an LED based illumination device 100A, reflector 125A, and light fixture 120A. FIG. 2 illustrates luminaire 150B with an LED based illumination device 100B, reflector 125B, and light fixture 120B. FIG. 3 illustrates luminaire 150C with an LED based illumination device 100C, reflector 125C, and light fixture 120C. For the sake of simplicity, LED based illumination devices 100A, 100B, and 100C may be collectively referred to as illumination device 100, reflectors 125A, 125B, and 125C may be collectively referred to as reflector 125, and light fixtures 120A, 120B, and 120C may be collectively referred to as light fixture 120. As illustrated in FIG. 3, the LED based illumination device 100 includes LEDs 102. As depicted, light fixture 120 includes a heat sink capability, and therefore may be sometimes referred to as heat sink 120. However, light fixture 120 may include other structural and decorative elements (not shown). Reflector 125 is mounted to illumination device 100 to collimate or deflect light emitted from illumination device 100. The reflector 125 may be made from a thermally conductive material, such as a material that includes aluminum or copper and may be thermally coupled to illumination device 100. Heat flows by conduction through illumination device 100 and the thermally conductive reflector 125. Heat also flows via thermal convection over the reflector 125. Reflector 125 may be a compound parabolic concentrator, where the concentrator is constructed of or coated with a highly reflecting material. Optical elements, such as a diffuser or reflector 125 may be detachably coupled to illumination device 100, e.g., by means of threads, a clamp, a twist-lock mechanism, or other appropriate arrangement. As illustrated in FIG. 3, the reflector 125 may include sidewalls 126 and a window 127 that are optionally coated, e.g., with a wavelength converting material, diffusing material or any other desired material.

As depicted in FIGS. 1, 2, and 3, illumination device 100 is mounted to heat sink 120. Heat sink 120 may be made from a thermally conductive material, such as a material that includes aluminum or copper and may be thermally coupled to illumination device 100. Heat flows by conduction through illumination device 100 and the thermally conductive heat sink 120. Heat also flows via thermal convection over heat sink 120. Illumination device 100 may be attached to heat sink 120 by way of screw threads to clamp the illumination device 100 to the heat sink 120. To facilitate easy removal and replacement of illumination device 100, illumination device 100 may be detachably coupled to heat sink 120, e.g., by means of a clamp mechanism, a twist-lock mechanism, or other appropriate arrangement. Illumination device 100 includes at least one thermally conductive surface that is thermally coupled to heat sink 120, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink 120 may permit the LEDs 102 to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination device 100.

Figure 4:
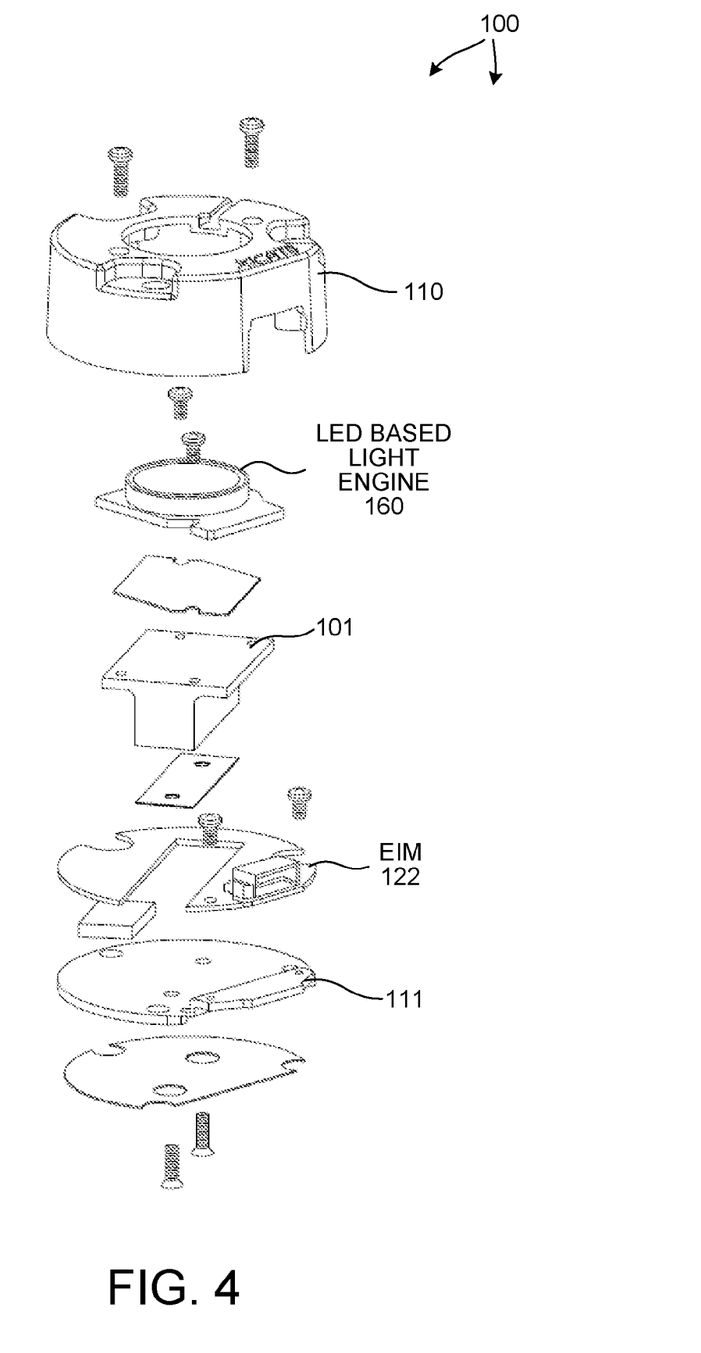
FIG. 4 shows an exploded view illustrating components of LED based illumination devices as depicted in FIG. 2.

FIG. 4 shows an exploded view illustrating components of LED based illumination device 100 as depicted in FIG. 2. It should be understood that as defined herein an LED based illumination device is not an LED, but is an LED light source or fixture or component part of an LED light source or fixture. LED based illumination device 100 includes an LED based light engine 160 configured to generate an amount of light. LED based light engine 160 is coupled to a mounting base 101 to promote heat extraction from LED based light engine 160. Optionally, an electrical interface module (EIM) 122 is shaped to fit around mounting base 101. LED based light engine 160 and mounting base 101 are enclosed between a lower mounting plate 111 and an upper housing 110. An optional reflector retainer (not shown) is coupled to upper housing 110. The reflector retainer is configured to facilitate attachment of different reflectors to the LED based illumination device 100.

Figure 5:
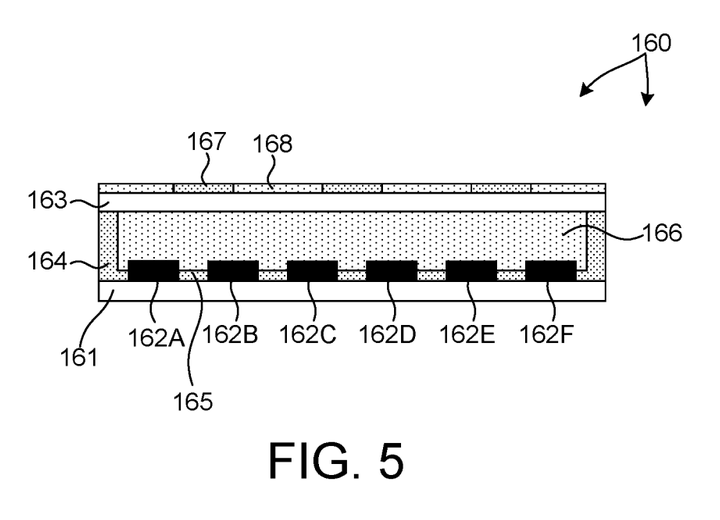
FIG. 5 is illustrative of LED based light engine that may be used in the LED based illumination device.

FIG. 5 is illustrative of LED based light engine 160 in one embodiment. LED based light engine 160 includes one or more LED die or packaged LEDs and a mounting board to which LED die or packaged LEDs are attached. In addition, LED based light engine 160 includes one or more transmissive elements (e.g., windows or sidewalls) coated or impregnated with one or more wavelength converting materials to achieve light emission at a desired color point.

As illustrated in FIG. 5, LED based light engine 160 includes a number of LEDs 162A-F (collectively referred to as LEDs 162) mounted to mounting board 161 in a chip on board (COB) configuration. The spaces between each LED are filled with a reflective material 165 (e.g., a white silicone material). In addition, a dam of reflective material 164 surrounds the LEDs 162 and supports transmissive element 163, sometimes referred to as transmissive plate 163. The space between LEDs 162 and transmissive element 163 is filled with an encapsulating material 166 (e.g., silicone) to promote light extraction from LEDs 162 and to separate LEDs 162 from the environment. In the depicted embodiment, the dam of reflective material 164 is both the thermally conductive structure that conducts heat from transmissive plate 163 to LED mounting board 161 and the optically reflective structure that reflects incident light from LEDs 162 toward transmissive plate 163.

LEDs 162 can emit different or the same color light, either by direct emission or by phosphor conversion, e.g., where phosphor layers are applied to the LEDs as part of the LED package. The illumination device 100 may use any combination of colored LEDs 162, such as red, green, blue, ultraviolet, amber, or cyan, or the LEDs 162 may all produce the same color light. Some or all of the LEDs 162 may produce white light. In addition, the LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. The light emitted from the illumination device 100 has a desired color when LEDs 162 are used in combination with wavelength converting materials on transmissive plate 163, for example. By tuning the chemical and/or physical (such as thickness and concentration) properties of the wavelength converting materials and the geometric properties of the coatings on the surface of transmissive plate 163, specific color properties of light output by LED based illumination device 100 may be specified, e.g., color point, color temperature, and color rendering index (CRT).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

By way of example, phosphors may be chosen from the set denoted by the following chemical formulas: $Y_3Al_5O_{12}$:Ce, (also known as YAG:Ce, or simply YAG) $(Y,Gd)_3Al_5O_{12}$:Ce, CaS:Eu, SrS:Eu, $SrGa_2S_4$:Eu, $Ca_3(Sc,Mg)_2Si_3O_{12}$:Ce, $Ca_3Sc_2Si_3O_{12}$:Ce, $Ca_3Sc_2O_4$:Ce, $Ba_3Si_6O_{12}N_2$:Eu, $(Sr,Ca)AlSiN_3$:Eu, $CaAlSiN_3$:Eu, $CaAlSi(ON)_3$:Eu, $Ba_2SiO_4$:Eu, $Sr_2SiO_4$:Eu, $Ca_2SiO_4$:Eu, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Ga_5O_{12}$:Ce, $Gd_3Ga_5O_{12}$:Ce, $Tb_3Al_5O_{12}$:Ce, $Tb_3Ga_5O_{12}$:Ce, and $Lu_3Ga_5O_{12}$:Ce.

In one example, the adjustment of color point of the illumination device may be accomplished by adding or removing wavelength converting material from transmissive plate 163. In one embodiment a red emitting phosphor 168 such as an alkaline earth oxy silicon nitride covers a portion of transmissive plate 163, and a yellow emitting phosphor 167 such as a YAG phosphor covers another portion of transmissive plate 163.

In some embodiments, the phosphors are mixed in a suitable solvent medium with a binder and, optionally, a surfactant and a plasticizer. The resulting mixture is deposited by any of spraying, screen printing, blade coating, jetting, or other suitable means. By choosing the shape and height of the transmissive plate 163, and selecting which portions of transmissive plate 163 will be covered with a particular phosphor or not, and by optimization of the layer thickness and concentration of a phosphor layer on the surfaces, the color point of the light emitted from the device can be tuned as desired.

In one example, a single type of wavelength converting material may be patterned on a portion of transmissive plate 163. By way of example, a red emitting phosphor 168 may be patterned on different areas of the transmissive plate 163 and a yellow emitting phosphor 167 may be patterned on other areas of transmissive plate 163. In some examples, the areas may be physically separated from one another. In some other examples, the areas may be adjacent to one another. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 162 varies. The color performance of the LEDs 162, red phosphor and the yellow phosphor may be measured and modified by any of adding or removing phosphor material based on performance so that the final assembled product produces the desired color temperature.

Transmissive plate 163 may be constructed from a suitable optically transmissive material (e.g., sapphire, quartz, alumina, crown glass, polycarbonate, and other plastics). Transmissive plate 163 is spaced above the light emitting surface of LEDs 162 by a clearance distance. In some embodiments, this is desirable to allow clearance for wire bond connections from the LED package submount to the active area of the LED. In some embodiments, a clearance of one millimeter or less is desirable to allow clearance for wire bond connections. In some other embodiments, a clearance of two hundred microns or less is desirable to enhance light extraction from the LEDs 162.

In some other embodiments, the clearance distance may be determined by the size of the LED 162. For example, the size of the LED 162 may be characterized by the length dimension of any side of a single, square shaped active die area. In some other examples, the size of the LED 162 may be characterized by the length dimension of any side of a rectangular shaped active die area. Some LEDs 162 include many active die areas (e.g., LED arrays). In these examples, the size of the LED 162 may be characterized by either the size of any individual die or by the size of the entire array. In some embodiments, the clearance should be less than the size of the LED 162. In some embodiments, the clearance should be less than twenty percent of the size of the LED 162. In some embodiments, the clearance should be less than five percent of the size of the LED. As the clearance is reduced, light extraction efficiency may be improved, but output beam uniformity may also degrade.

In some other embodiments, it is desirable to attach transmissive plate 163 directly to the surface of the LED 162. In this manner, the direct thermal contact between transmissive plate 163 and LEDs 162 promotes heat dissipation from LEDs 162. In some other embodiments, the space between mounting board 161 and transmissive plate 163 may be filled with a solid encapsulate material. By way of example, silicone may be used to fill the space. In some other embodiments, the space may be filled with a fluid to promote heat extraction from LEDs 162.

In the embodiment illustrated in FIG. 5, the surface of patterned transmissive plate 163 facing LEDs 162 is coupled to LEDs 162 by an amount of flexible, optically translucent encapsulating material 166. By way of non-limiting example, the flexible, optically translucent encapsulating material 166 may include an adhesive, an optically clear silicone, a silicone loaded with reflective particles (e.g., titanium dioxide (TiO2), zinc oxide (ZnO), and barium sulfate (BaSO4) particles, or a combination of these materials), a silicone loaded with a wavelength converting material (e.g., phosphor particles), a sintered PTFE material, etc. Such material may be applied to couple transmissive plate 163 to LEDs 162 in any of the embodiments described herein.

In some embodiments, multiple, stacked transmissive layers or plates are employed. Each transmissive plate includes different wavelength converting materials. For example, a transmissive plate including a wavelength converting material may be placed over another transmissive plate including a different wavelength converting material. In this manner, the color point of light emitted from LED based illumination device 100 may be tuned by replacing the different transmissive plates independently to achieve a desired color point. In some embodiments, the different transmissive plates may be placed in contact with each other to promote light extraction. In some other embodiments, the different transmissive plates may be separated by a distance to promote cooling of the transmissive layers. For example, airflow may be introduced through the space to cool the transmissive layers.

The mounting board 161 provides electrical connections to the attached LEDs 162 to a power supply (not shown). In one embodiment, the LEDs 162 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 162 may include a lens over the LED chips. Alternatively, LEDs without a lens may be used. LEDs without lenses may include protective layers, which may include phosphors. The phosphors can be applied as a dispersion in a binder, or applied as a separate plate. Each LED 162 includes at least one LED chip or die, which may be mounted on a submount. The LED chip typically has a size about 1 mm by 1 mm by 0.5 mm, but these dimensions may vary. In some embodiments, the LEDs 162 may include multiple chips. The multiple chips can emit light of similar or different colors, e.g., red, green, and blue. The LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. In addition, different phosphor layers may be applied on different chips on the same submount. The submount may be ceramic or other appropriate material. The submount typically includes electrical contact pads on a bottom surface that are coupled to contacts on the mounting board 161. Alternatively, electrical bond wires may be used to electrically connect the chips to a mounting board. Along with electrical contact pads, the LEDs 162 may include thermal contact areas on the bottom surface of the submount through which heat generated by the LED chips can be extracted. The thermal contact areas are coupled to heat spreading layers on the mounting board 161. Heat spreading layers may be disposed on any of the top, bottom, or intermediate layers of mounting board 161. Heat spreading layers may be connected by vias that connect any of the top, bottom, and intermediate heat spreading layers.

In some embodiments, the mounting board 161 conducts heat generated by the LEDs 162 to the sides of the mounting board 161 and the bottom of the mounting board 161. In one example, the bottom of mounting board 161 may be thermally coupled to a heat sink 120 (shown in FIGS. 1-3) via mounting base 101. In other examples, mounting board 161 may be directly coupled to a heat sink, or a lighting fixture and/or other mechanisms to dissipate the heat, such as a fan. In some embodiments, the mounting board 161 conducts heat to a heat sink thermally coupled to the top of the mounting board 161. Mounting board 161 may be an FR4 board, e.g., that is 0.5 mm thick, with relatively thick copper layers, e.g., 30 μm to 100 m, on the top and bottom surfaces that serve as thermal contact areas. In other examples, the mounting board 161 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 161 includes electrical pads to which the electrical pads on the LEDs 162 are connected. The electrical pads are electrically connected by a metal, e.g., copper, trace to a contact, to which a wire, bridge or other external electrical source is connected. In some embodiments, the electrical pads may be vias through the mounting board 161 and the electrical connection is made on the opposite side, i.e., the bottom, of the board. Mounting board 161, as illustrated, is rectangular in dimension. However, in general, mounting board 161 may be configured in any suitable shape. LEDs 162 mounted to mounting board 161 may be arranged in different configurations on mounting board 161. In one example LEDs 162 are aligned in rows extending in the length dimension and in columns extending in the width dimension of mounting board 161. In another example, LEDs 162 are arranged in a hexagonally closely packed structure. In such an arrangement each LED is equidistant from each of its immediate neighbors. Such an arrangement is desirable to increase the uniformity and efficiency of emitted light.

Figure 6:
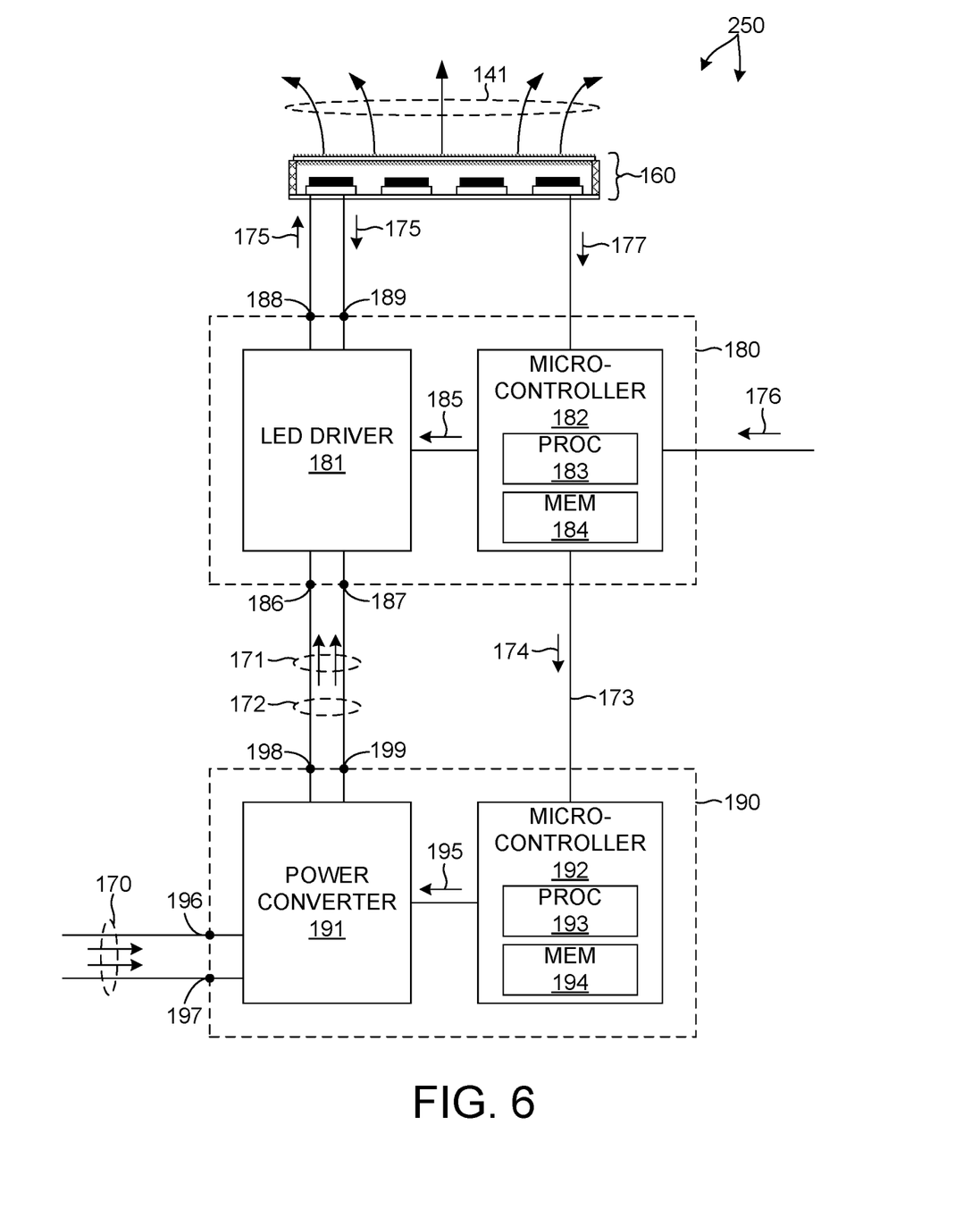
FIG. 6 depicts a lighting system including an LED based light engine, a controlled current power supply (CCPS), and a controlled voltage power supply (CVPS).

FIG. 6 depicts a lighting system 250 including an LED based light engine 160, a controlled current power supply (CCPS) 180, and a controlled voltage power supply (CVPS) 190. CCPS 180 is electrically coupled to LED based light engine 160 and CVPS 190. CCPS 180 receives controlled voltage electrical power 171 from CVPS 190 and supplies electrical current 175 to LED based light engine 160 that causes the LEDs to illuminate and generate light 141. CVPS 190 receives electrical power 170 from an electrical mains power source (e.g., building power) and generates controlled voltage electrical power 171 to CCPS 180.

In some embodiments, CVPS 190 receives alternating current (AC) electrical power 170 (e.g., 120V AC, 220V AC, etc.) from an electrical mains power source and provides controlled voltage direct current (DC) electrical power 171 (e.g., 24V DC, 48V DC, etc.). In turn, CCPS 180 receives controlled voltage electrical power 171 and generates a controlled, direct current (DC) electrical current 175 to LED based light engine 160.

In some embodiments, CCPS 180 is a constant current power supply. In some other embodiments, CCPS 180 is a switched mode power supply. In some other embodiments, CCPS 180 is configured to operate in both constant current and switched modes. In some other embodiments, CCPS 180 is a linear current regulator such as current regulator 202 depicted in FIG. 7.

In some embodiments, CCPS 180 receives DC electrical power from CVPS 190 and supplies electrical power at a regulated current value to LED based light engine 160. In this manner, CCPS 180 operates as a DC/DC power converter, and CVPS 190 operates as an AC/DC power converter. However, in some other embodiments, CCPS 180 receives AC electrical power from CVPS 190 and supplies electrical power at a regulated current value to LED based light engine 160. In this manner, CCPS 180 operates as an AC/DC power converter and CVPS 190 operates as an AC/AC power converter.

Due to operational inefficiencies, each element of lighting system 250 depicted in FIG. 6 contributes to energy losses. For example, the voltage difference between the voltage supplied to CCPS 180 and the forward voltage of the LED load impacts the power conversion efficiency of CCPS 180. In general, the closer the match between the forward voltage of the LED load and the voltage supplied to the CCPS 180, the higher the power conversion efficiency. However, the input voltage cannot fall below the forward voltage of the LED load, or the LEDs may fail to illuminate.

In another example, the resistive losses inherent in the conductors 172 employed to deliver electrical power from the CVPS 190 to the CCPS 180 contribute to overall lighting system inefficiency. Wire losses in a low voltage DC bus system are proportional to resistance and proportional to the square of the current flow. Thus, significant reductions in input voltage may give rise to significant increases in power line losses, particularly as the length, and corresponding electrical resistance of conductors 172 increases.

Finally, the efficiency of CVPS 190 tends to decrease as the voltage generated by CVPS 190 decreases due to increased losses in the output diode and ripple in the output capacitor(s).

In general, different LED based light engines have different forward voltage characteristics depending on individual LED characteristics and circuit arrangement. Thus, it is not possible to determine a single, universally applied supply voltage that optimizes energy efficiency for all lighting systems.

In one aspect, the overall electrical efficiency of a lighting system is increased by communicating electrical characteristics among any of LED based light engine 160, CCPS 180, and CVPS 190 and adjusting the voltage of the electrical power supplied to CCPS 180 by CVPS 190 based on the electrical characteristics.

As depicted in FIG. 6, alternating current (AC) electrical power 170 is supplied to CVPS 190 at the available mains voltage (e.g., 110V, 220V, etc.) over input nodes 196 and 197. CVPS 190 includes a power converter 191 to convert the AC electrical power 170 to direct current (DC) electrical power 171 at a particular voltage level across output nodes 198 and 199 of CVPS 190.

In one aspect, CVPS 190 includes a microcontroller 192 configured to control the output voltage generated by power converter 191 across output nodes 198 and 199 based at least in part on signals 174 received from the CCPS 180. Microcontroller 192 includes a processor 193 and an amount of memory 194 including instructions that cause the processor 193 to determine adjustments of the output voltage generated by power converter 191 based at least in part on information communicated by signals 174. Microcontroller 192 communicates signals 195 to power converter 191 that are indicative of the desired output voltage. In response, power converter 191 adjusts its operational characteristics to achieve the desired output voltage.

In the embodiment depicted in FIG. 6, CCPS 180 is communicatively coupled to CVPS 190 by conductor(s) 173. However, in general, any communication link between CCPS 180 and CVPS 190 may be contemplated within the scope of this patent document. For example, data communication over power lines (e.g., using a power line communication protocol), separate control wires (e.g., using a digital addressable lighting interface (DALI) protocol, universal asynchronous receiver/transceiver (UART) protocol, serial (RS232), etc.), or over a wireless communication link (e.g., Bluetooth Low Energy, WiFi, etc.) may be contemplated.

As depicted in FIG. 6, DC electrical power 171 is provided to CCPS 180 over input nodes 186 and 187. CCPS 180 includes an LED driver 181 to convert the DC electrical power 171 to electrical current 175 supplied to LED based light engine 160 over output nodes 188 and 189 of CCPS 180.

In some embodiments, CCPS 180 includes a microcontroller 182 configured to receive control commands 176 from an external control device (e.g., lighting control system, dimmer, switch, etc.) and communicate control commands 185 to LED driver 181. In addition, microcontroller 182 communicates signals 174 indicative of electrical characteristics of CCPS 180 to CVPS 190. In one example, microcontroller 182 includes a processor 183 and an amount of memory 184 including instructions that cause the processor 183 to determine electrical characteristics available on CCPS 180. Microcontroller 182 communicates signals 174 indicative of these characteristics to CVPS 190. In some examples, the electrical characteristics available on CCPS 180 are derived from electrical characteristics measured on CCPS 180 itself, e.g., input voltage, output voltage, etc. In some other examples, the electrical characteristics available on CCPS 180 are received from LED based light engine 160. By way of non-limiting example, signals 177 communicated from LED based light engine 160 to CCPS 180 includes any of a serial number, measured junction temperature, measured mounting board 161 temperature, forward voltage characteristics, etc. associated with LED based light engine 160. Similarly, some or all of these characteristics may be communicated to CVPS 190 as part of signals 174.

In one example, CVPS 190 is configured to receive signals 174 indicative of the voltage across the input nodes 186 and 187 of CCPS 180. In addition, microcontroller 192 determines the voltage across the output nodes 198 and 199 of CVPS 190. Microcontroller 192 determines a difference between the output voltage across the output nodes of the CVPS 190 and the input voltage across the input nodes of the CCPS 180. This difference provides an indication of the electrical losses associated with conductors 172. Based on this difference, microcontroller 192 communicates control commands 195 to power converter 191 that cause power converter 191 to adjust its output voltage to compensate for line losses.

In another example, CCPS 180 is configured to communicate to CVPS 190 an indication of a minimum input voltage required by CCPS 180 to operate under the load of LED based light engine 160. In response, microcontroller 192 ensures that adjustments to the output voltage generated by CVPS 190 do not cause the output voltage generated by CVPS 190 to fall below the minimum value required by CCPS 180.

In another example, CCPS 180 is configured to communicate to CVPS 190 an indication of a maximum safe input voltage required by CCPS 180 to operate safely under the load of LED based light engine 160. In response, microcontroller 192 ensures that adjustments to the output voltage generated by CVPS 190 do not cause the output voltage generated by CVPS 190 to rise above the maximum value to ensure safe operation of CCPS 180.

In another example, CCPS 180 is configured to communicate to CVPS 190 an indication of a serial number of CCPS 180. In this manner, CVPS 190 is aware of the identity of the CCPS 180 to which it is electrically coupled.

Figure 7:
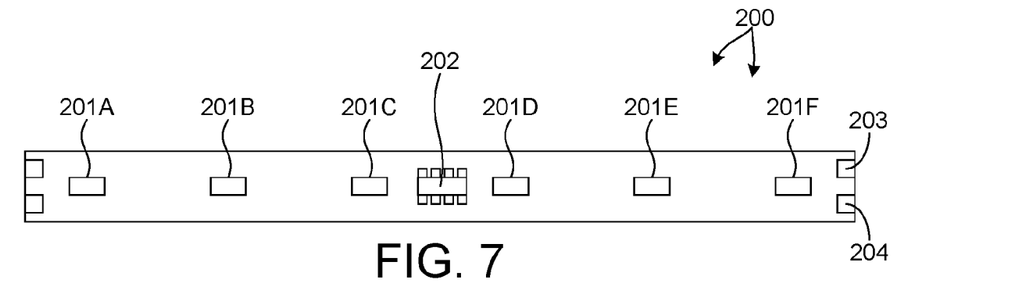
FIG. 7 depicts an LED based illumination device that includes a number of LEDs and a current regulator.
Figure 8:
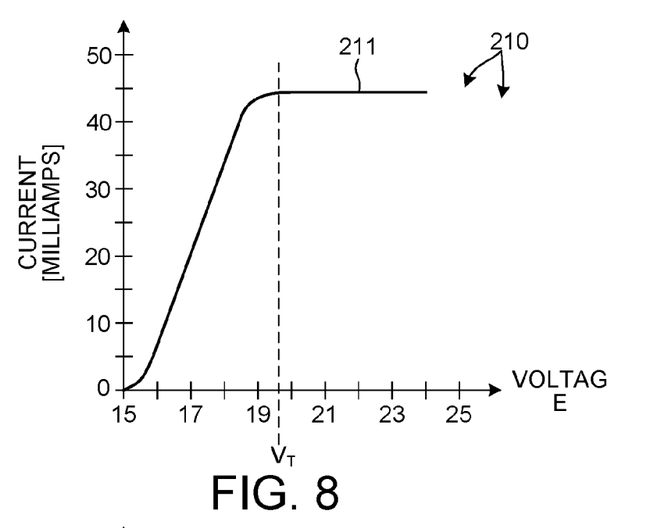
FIG. 8 depicts a plot of operating current as a function of input voltage supplied to an LED based illumination device, such as that depicted in FIG. 7.
Figure 9:
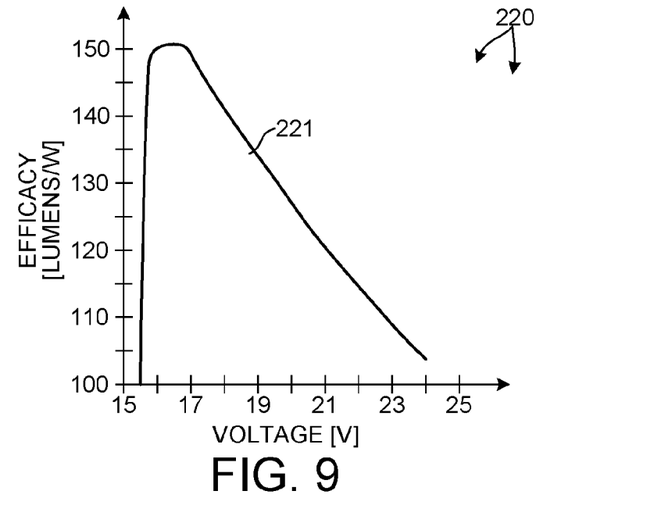
FIG. 9 depicts a plot of luminous efficacy as a function of input voltage supplied to an LED based illumination device, such as that depicted in FIG. 7.

In another example, CCPS 180 is configured to communicate to CVPS 190 an indication of an efficacy of the combination of CCPS 180 and LED based light engine 160 as a function of the input voltage across input nodes 186 and 187. In response, CVPS 190 adjusts output voltage supplied across nodes 186 and 187 based at least in part on this efficacy. FIG. 8 depicts a plot 210 of operating current as a function of input voltage supplied to LED based illumination device 200 depicted in FIG. 7. FIG. 9 depicts a plot 220 of luminous efficacy as a function of input voltage supplied to LED based illumination device 200 depicted in FIG. 7. Plotlines 211 of FIG. 8 and plotlines 221 of FIG. 9 are representative of the performance of Luxeon® model XF-3014 CV manufactured by Lumileds Lighting, San Jose, Calif. (USA). As depicted in FIG. 8, full illumination of the LED based illumination device 200 is not achieved until a threshold voltage, $V_T$, is reached (approximately 19.5 Volts). In addition, as depicted in FIG. 9, luminous efficacy drops with increasing voltage above approximately 17 Volts. In this example, CVPS 190 adjusts its output voltage such that the voltage supplied to the input terminals of LED based illumination device 200 is greater than 19.5 Volts to ensure full illumination, but with only the minimum required headroom to ensure successful operation, so that efficacy is not unnecessarily reduced.

In another example, CVPS 190 is configured to determine its electrical conversion efficiency at the current output voltage level. In one example, CVPS 190 determines its electrical conversion efficiency by determining a ratio of the electrical power provided across the output nodes 198 and 199 of CVPS 190 and the electrical power received across input nodes 196 and 197 of CVPS 190 at the current output voltage level. Microcontroller 192 then communicates signal 195 to power converter 191 that causes power converter 191 to change the output voltage provided across nodes 198 and 199 to a different value. CVPS 190 determines its efficiency at this new operating output voltage level in a similar manner. Based on the difference in efficiency between the two operating points, microcontroller 192 communicates signal 195 to power converter 191 that causes power converter 191 to change the output voltage provided across nodes 198 and 199 to yet another different value. For example, if an increase in the operating output voltage caused an increase in efficiency, then a further increase in operating voltage is prescribed. However, if an increase in the operating output voltage caused a decrease in efficiency, then a decrease in operating voltage is prescribed. In some embodiments, incremental adjustments in the operating output voltage continue to be made until an operating point is realized where CVPS 190 is operating at a maximum power conversion efficiency.

In another example, CCPS 180 is configured to communicate to CVPS 190 that CCPS 180 is dimming the luminous output of LED based light engine 160. In response, CVPS 190 adjusts the voltage supplied to the input nodes 186 and 187 of CCPS 180 based at least in part on the indication that CCPS 180 is dimming the LED based light engine.

In another example, CVPS 190 is coupled to a current regulator circuit that provides a constant current to the LED light engine, such as the constant current regulator provided in the Luxeon® model XF-3014 CV manufactured by LumiLEDs Lighting, San Jose, Calif. (USA). In one example, CVPS 190 adjusts the output voltage provided across output nodes 198 and 199 and monitors the supplied electrical current. As depicted in FIG. 8, when the voltage supplied to the current regulator circuit is above a threshold value, $V_T$, the current regulator circuit provides constant current to the LEDs and dissipates excess electrical power. In this scenario, the induced current flow from CVPS 190 to CCPS 180 is constant. However, when the voltage supplied to the current regulator is below the threshold value, $V_T$, the current regulator circuit is unable to supply adequate current to the LEDs to ensure full illumination. In this scenario, a ripple is visible in the induced current flow from CVPS 190 to CCPS 180. In this example, CVPS 190 is configured to adjust the output voltage provided across output nodes 198 and 199 and monitor the induced current flow to identify the threshold voltage value where the least amount of electrical power is dissipated by the current regulator circuit while still maintaining sufficient current to the LEDs. In this example, CVPS 190 adjusts the output voltage downward and monitors the induced current until a current ripple is identified. When a ripple in the current flow is identified, CVPS 190 adjusts the output voltage upward until the ripple disappears. At this point, CVPS 190 maintains this output voltage value.

In another aspect, CVPS 190 is configured to identify the CCPS 180 to which it is supplying electrical power. In one example, CVPS 190 dynamically adjusts the output voltage across output nodes 198 and 199 of CVPS 190. For example, CVPS 190 may vary its output voltage at a fixed frequency or in a particular pattern. CCPS 180 is configured to detect the incoming voltage level across input nodes 186 and 187 of CCPS 180. If CCPS 180 detects a variation in its input voltage that matches a particular frequency or pattern, CCPS 180 communicates an indicator of this event (e.g., flag) to CVPS 190 via signal 174.

In one embodiment, CCPS 180 is constructed as part of electronic interface module (EIM) 120 depicted in FIG. 4. In this manner, LED based light engine 160 and CCPS 180 are each part of an integrated mechanical assembly that comprises LED based illumination device 100.

In some embodiments, an LED based illumination device includes a LED based light engine 160 and a controlled current power supply (CCPS) 190 integrated together with the light engine. For example, FIG. 7 depicts an LED based illumination device 200 that includes a number of LEDs 201A-F. Controlled voltage electrical power is supplied to LED based illumination device 200 on terminals 203 and 204. A current regulator 202 receives the controlled voltage electrical power and supplies LEDs 201A-F with controlled current electrical power.

In general, any of an LED based light engine 160, CCPS 180, and CVPS 190 may be integrated together or packaged separately from one another.

Although FIG. 6 illustrates a single LED based light engine 160 and CCPS 180 electrically coupled to CVPS 190, in general, any number of LED based light engines and associated controlled current power supplies may be electrically coupled to CVPS 190. In this manner, CVPS 190 may be configured to supply voltage to any number of controlled current power supplies and associated LED based light engines. Electrical characteristics associated with one or more of the controlled current power supplies electrically coupled to CVPS 190 may be communicated to CVPS 190 and adjustments to the output voltage generated by CVPS 190 are made based at least in part on those electrical characteristics. In this manner, the efficacy of a lighting system including multiple LED based light engines may be optimized.

Figure 10:
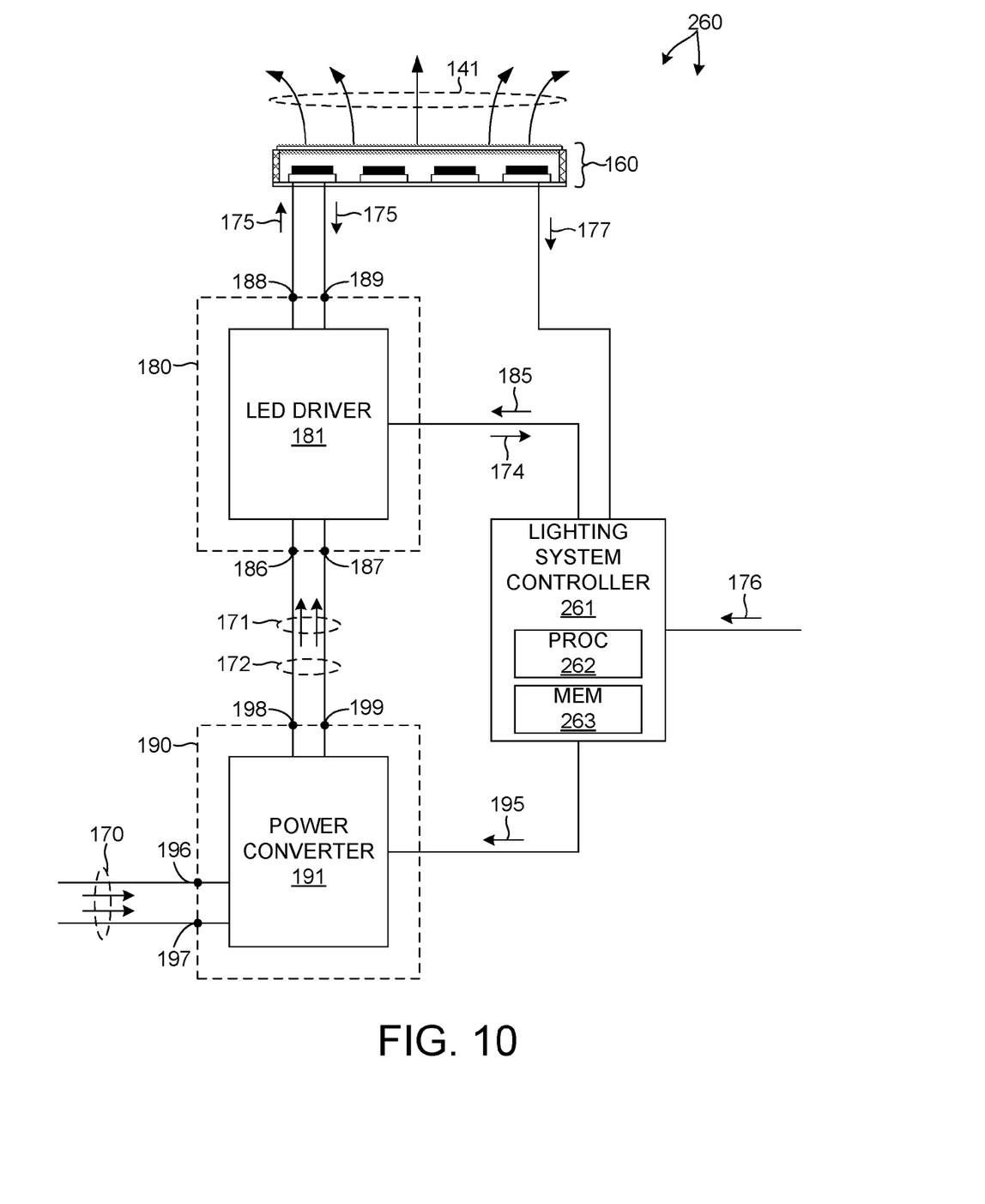
FIG. 10 depicts another embodiment of a lighting system including an LED based light engine, a controlled current power supply (CCPS), and a controlled voltage power supply (CVPS).

FIG. 10 depicts a lighting system 260 in another embodiment. Like numbered elements are analogous to those described with reference to FIG. 6. Lighting system 260 differs from lighting system 250 depicted in FIG. 6 in that it includes a lighting system controller 261 that performs some or all of the functions of microcontrollers 182 and 192 described with reference to FIG. 6. As depicted in FIG. 10, lighting system microcontroller 261 is communicatively coupled to CCPS 180, CVPS 190, and optionally to LED based light engine 160. Microcontroller 261 includes processor 262 and an amount of memory 263 including instructions that cause processor 262 to receive signals onto lighting system controller 261, process those signals, and communicate control commands to any of CVPS 190 and CCPS 180 in a manner analogous to that described with reference to FIG. 6.

In the embodiment depicted in FIG. 10, lighting system controller 261 is communicatively coupled to CVPS 190, CCPS 180, and LED based light engine 160 by electrical conductors. However, in general, any communication link among any of CCPS 180, CVPS 190, and LED based light engine 160 may be contemplated within the scope of this patent document. For example, data communication over power lines (e.g., using a power line communication protocol), separate control wires (e.g., using a digital addressable lighting interface (DALI) protocol, universal asynchronous receiver/transceiver (UART) protocol, serial (RS232), etc.), or a wireless communication link (e.g., Bluetooth Low Energy, WiFi, etc.) may be contemplated.

Although lighting system 260 depicted in FIG. 10 does not include microcontrollers 182 and 192 described with reference to FIG. 6, in general, CCPS 180 and CVPS 190 depicted in FIG. 10 may include microcontrollers 182 and 192, respectively. In these embodiments, microcontrollers 182 and 192 may be configured to perform some or all of the functions described with reference to FIG. 6.

Figure 11:
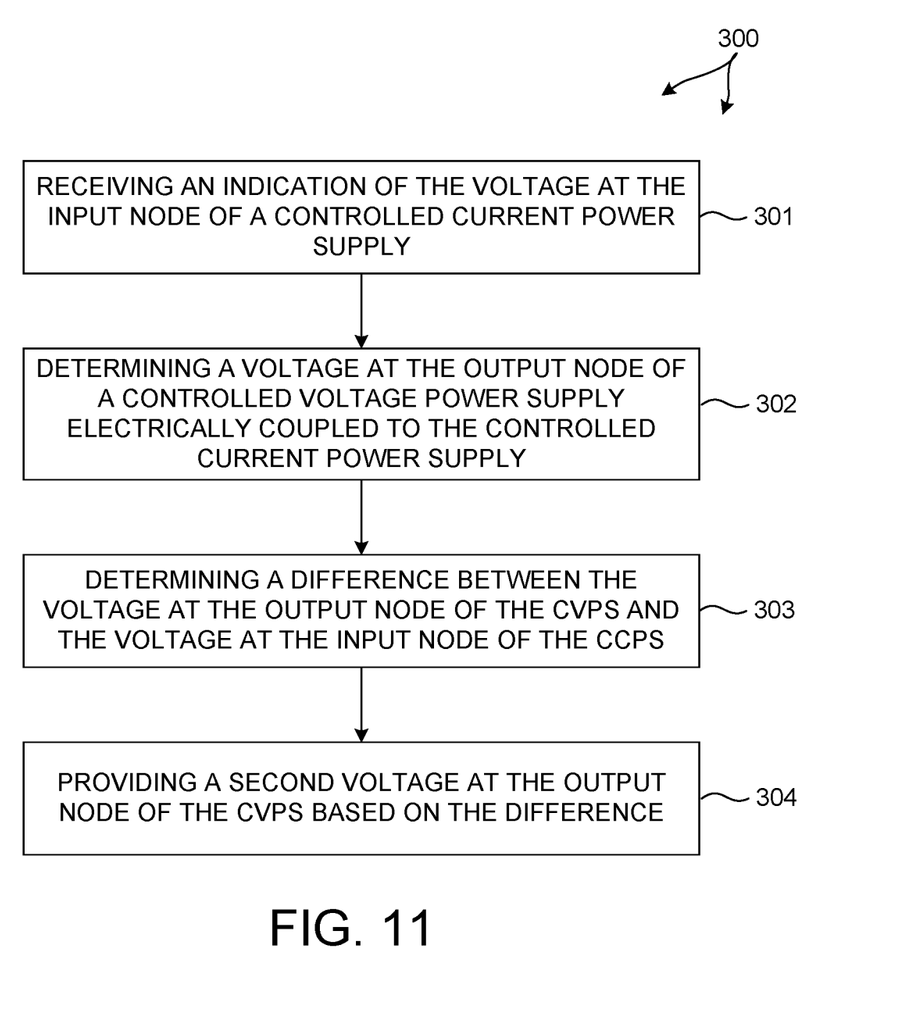
FIG. 11 illustrates a process flow suitable for implementation by a controlled voltage power supply (CVPS).

FIG. 11 illustrates a process flow 300 suitable for implementation by CVPS 190 of the present invention. In one aspect, it is recognized that data processing steps of the process flow 300 may be carried out via a pre-programmed algorithm executed by one or more processors of CVPS 190. While the following description is presented in the context of CVPS 190, it is recognized herein that the particular structural aspects of CVPS 190 do not represent limitations and should be interpreted as illustrative only.

In block 301, an indication of a voltage at an input node of a controlled current power supply (CCPS) is received onto a controlled voltage power supply (CVPS) that is electrically coupled to the CCPS. The CCPS is electrically coupled to an LED based light engine comprising a plurality of light emitting diodes electrically coupled in series.

In block 302, a voltage at an output node of the CVPS is determined.

In block 303, a difference between the voltage at the output node of the CVPS and the voltage at the input node of the CCPS is determined.

In block 304, a second voltage is provided at the output node of the CVPS based at least in part on the difference.

Although certain specific embodiments are described above for instructional purposes, the teachings of this patent document have general applicability and are not limited to the specific embodiments described above. For example, LED based illumination device 100 is depicted in FIGS. 1-3 as a part of a luminaire 150. As illustrated in FIG. 3, LED based illumination device 100 may be a part of a replacement lamp or retrofit lamp. But, in another embodiment, LED based illumination device 100 may be shaped as a replacement lamp or retrofit lamp and be considered as such. Accordingly, various modifications, adaptations, and combinations of various features of the described embodiments can be practiced without departing from the scope of the invention as set forth in the claims.

What is claimed is:

1. An LED based lighting system comprising:
an LED based light engine comprising a plurality of light emitting diodes electrically coupled in series;
a controlled current power supply (CCPS) having an input node and an output node, wherein the LED based light engine is electrically coupled to the output node of the CCPS, wherein the CCPS is configured to receive electrical power on the input node of the CCPS and provide electrical power to the LED based light engine on the output node of the CCPS; and
a controlled voltage power supply (CVPS) having an input node and an output node, wherein the input node of the CCPS is electrically coupled to the output node of the CVPS, the CVPS configured to receive electrical power on the input node of the CVPS and provide the electrical power to the CCPS on the output node of the CVPS, the CVPS configured to:

receive an indication of a first voltage at the input node of the CCPS;
determine a second voltage at the output node of the CVPS;
determine a difference between the second voltage at the output node of the CVPS and the first voltage at the input node of the CCPS; and
provide a third voltage at the output node of the CVPS based on the difference.

2. The LED based lighting system of claim 1, wherein the CCPS is further configured to communicate an indication of a minimum operating power supply voltage to the CVPS.

3. The LED based lighting system of claim 1, wherein the CCPS is further configured to communicate an indication of a maximum safe power supply voltage to the CVPS.

4. The LED based lighting system of claim 1, wherein the CCPS is further configured to communicate an indication of a serial number of the CCPS to the CVPS.

5. The LED based lighting system of claim 1, wherein the CCPS is further configured to communicate an indication of an efficacy of the LED based light engine as a function of voltage at the input node of the CCPS.

6. The LED based lighting system of claim 1, wherein the CVPS is further configured to determine the third voltage at the output node of the CVPS based at least in part on any of a minimum operating power supply voltage to the CVPS, a maximum safe power supply voltage to the CVPS, and an efficacy of the LED based light engine as a function of voltage at the input node of the CCPS.

7. The LED based lighting system of claim 1, wherein the CVPS is electrically coupled to an electrical power source at the input node of the CVPS, the CVPS further configured to:
provide a fourth voltage at the output node of the CVPS;
determine a first efficiency of the CVPS, wherein the determining of the first efficiency of the CVPS comprises determining a ratio of the electrical power provided across the output node of the CVPS while providing the fourth voltage at the output node of the CVPS and the electrical power received across the input node of the CVPS;
provide a fifth output voltage at the output node of the CVPS;
determine a second efficiency of the CVPS, wherein the determining of the second efficiency of the CVPS comprises determining a ratio of the electrical power provided across the output node of the CVPS while providing the fifth voltage at the output node of the CVPS and the electrical power received across the input node of the CVPS; and
provide a sixth output voltage at the output node of the CVPS based on a difference between the first efficiency and the second efficiency of the CVPS.

8. The LED based lighting system of claim 1, wherein the CCPS is further configured to communicate an indication that the CCPS is dimming the LED based light engine, and wherein the CVPS is further configured to adjust the third voltage at the output node of the CVPS based on the indication that the CCPS is dimming the LED based light engine.

9. The LED based lighting system of claim 1, wherein the CVPS is further configured to adjust the third voltage at the output node of the CVPS, and wherein the CCPS is further configured to identify the CVPS based on the adjustment of the third voltage detected on the input node of the CCPS.

10. A method comprising:
receiving an indication of a first voltage at an input node of a controlled current power supply (CCPS), wherein an output node of the CCPS is electrically coupled to an LED based light engine comprising a plurality of light emitting diodes electrically coupled in series;
determining a second voltage at an output node of a controlled voltage power supply (CVPS), wherein the input node of the CCPS is electrically coupled to the output node of the CVPS;
determining a difference between the second voltage at the output node of the CVPS and the first voltage at the input node of the CCPS; and
providing a third voltage at the output node of the CVPS based at least in part on the difference.

11. The method of claim 10, further comprising:
receiving an indication of a minimum operating power supply voltage from the CCPS, wherein the third voltage is determined based at least in part on the indication of the minimum operating power supply voltage.

12. The method of claim 10, further comprising:
receiving an indication of a maximum safe power supply voltage from the CCPS, wherein the third voltage is determined based at least in part on the indication of the maximum safe power supply voltage.

13. The method of claim 10, further comprising:
receiving an indication of a serial number from the CCPS.

14. The method of claim 10, further comprising:
receiving an indication of an efficacy of the LED based light engine as a function of the first voltage at the input node of the CCPS, wherein the third voltage is determined based at least in part on the indication of the efficacy of the LED based light engine as the function of the first voltage at the input node of the CCPS.

15. The method of claim 10, further comprising:
providing a fourth voltage at the output node of the CVPS;
determining a first efficiency of the CVPS, wherein the determining of the first efficiency of the CVPS involves determining a ratio of the electrical power provided across the output node of the CVPS while providing the fourth voltage at the output node of the CVPS and the electrical power received across the input node of the CVPS;
providing a fifth output voltage at the output node of the CVPS;
determining a second efficiency of the CVPS, wherein the determining of the second efficiency of the CVPS involves determining a ratio of the electrical power provided across the output node of the CVPS while providing the fifth voltage at the output node of the CVPS and the electrical power received across the input node of the CVPS; and
providing a sixth output voltage at the output node of the CVPS based on a difference between the first efficiency and the second efficiency of the CVPS.

16. The method of claim 10, further comprising:
receiving an indication that the CCPS is dimming the LED based light engine; and
adjusting the third voltage at the output node of the CVPS based on the indication that the CCPS is dimming the LED based light engine.

17. A programmable controlled voltage power supply (CVPS) comprising:
a power converter electrically coupled to an electrical power source and a controlled current power supply (CCPS); and
a microcontroller configured to:
receive an indication of an input voltage at an input node of the CCPS, wherein the CCPS is electrically coupled to an LED based light engine comprising a plurality of light emitting diodes electrically coupled in series;
determine an output voltage at an output node of the CVPS, wherein the input node of the CCPS is electrically coupled to the output node of the CVPS;
determine a difference between the output voltage at the output node of the CVPS and the input voltage at the input node of the CCPS; and
communicate a first command signal to the power converter that causes the power converter to provide a second output voltage at the output node of the CVPS based at least in part on the difference.

18. The CVPS of claim 17, wherein the microcontroller is further configured to:
communicate a second command signal to the power converter that causes the power converter to provide a third output voltage at the output node of the CVPS;
determine a first efficiency of the CVPS, wherein the determining of the first efficiency of the CVPS involves determining a ratio of the electrical power provided across the output node of the CVPS while providing the third output voltage at the output node of the CVPS and the electrical power received across the input node of the CVPS;
communicate a third command signal to the power converter that causes the power converter to provide a fourth output voltage at the output node of the CVPS;
determine a second efficiency of the CVPS, wherein the determining of the second efficiency of the CVPS involves determining a ratio of the electrical power provided across the output node of the CVPS while providing the fourth output voltage at the output node of the CVPS and the electrical power received across the input node of the CVPS; and
communicate a fourth command signal to the power converter that causes the power converter to provide a fifth output voltage at the output node of the CVPS based on a difference between the first efficiency and the second efficiency of the CVPS.

19. The CVPS of claim 17, wherein the microcontroller is further configured to:
receive an indication that the CCPS is dimming the LED based light engine; and
communicate a second command signal to the power converter that causes the power converter to adjust the second output voltage at the output node of the CVPS based on the indication that the CCPS is dimming the LED based light engine.

20. The CVPS of claim 17, wherein the microcontroller is further configured to:
communicate a second command signal to the power converter that causes the power converter to adjust the second output voltage at the output node of the CVPS, and wherein the CCPS is configured to identify the CVPS based on the adjustment of the output voltage detected on the input node of the CCPS.

* * * * *